(12) United States Patent
Shimizu

(10) Patent No.: US 7,264,070 B2
(45) Date of Patent: Sep. 4, 2007

(54) VEHICLE DRIVE SYSTEM

(75) Inventor: Kouichi Shimizu, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 316 days.

(21) Appl. No.: 10/940,659

(22) Filed: Sep. 15, 2004

(65) Prior Publication Data

US 2005/0067202 A1 Mar. 31, 2005

(30) Foreign Application Priority Data

Sep. 29, 2003 (JP) ............................. 2003-337883
Sep. 9, 2004 (JP) ............................. 2004-262462

(51) Int. Cl.
*B60K 6/00* (2006.01)
*B60K 1/00* (2006.01)
*B60K 17/356* (2006.01)
*B60L 11/00* (2006.01)

(52) U.S. Cl. .................. 180/65.2; 180/65.3; 180/65.6; 180/242; 180/243; 701/22

(58) Field of Classification Search ............... 180/65.2, 180/242, 243, 65.3, 65.6; 701/22; 903/945
See application file for complete search history.

(56) References Cited

U.S. PATENT DOCUMENTS

| 1,979,830 | A | * | 11/1934 | Grisenti ..................... 74/336.5 |
| 3,421,596 | A | * | 1/1969 | Livezey et al. ............. 180/243 |
| 4,090,577 | A | | 5/1978 | Moore |
| 5,352,164 | A | * | 10/1994 | Bensinger et al. .......... 475/223 |
| 5,627,438 | A | * | 5/1997 | Barrett ........................ 318/139 |
| 5,934,397 | A | | 8/1999 | Schaper |
| 5,960,897 | A | * | 10/1999 | Furuya et al. .............. 180/65.4 |
| 6,007,451 | A | * | 12/1999 | Matsui et al. ............... 477/19 |
| 6,258,006 | B1 | | 7/2001 | Hanyu et al. |
| 6,328,122 | B1 | * | 12/2001 | Yamada et al. ............. 180/65.3 |
| 6,416,437 | B2 | * | 7/2002 | Jung ............................ 475/8 |
| 6,484,832 | B1 | * | 11/2002 | Morisawa et al. .......... 180/65.2 |
| 6,490,945 | B2 | * | 12/2002 | Bowen ........................ 74/339 |
| 6,573,675 | B2 | * | 6/2003 | Schmitz et al. ............. 318/434 |
| 6,578,649 | B1 | * | 6/2003 | Shimasaki et al. .......... 180/65.2 |
| 6,622,804 | B2 | * | 9/2003 | Schmitz et al. ............. 180/65.2 |
| 2002/0177500 | A1 | * | 11/2002 | Bowen ........................ 475/5 |
| 2003/0221881 | A1 | * | 12/2003 | Lee ............................. 180/65.2 |
| 2004/0007404 | A1 | * | 1/2004 | Schmitz et al. ............. 180/65.2 |
| 2004/0204803 | A1 | * | 10/2004 | Matsuda et al. ............. 701/22 |

FOREIGN PATENT DOCUMENTS

EP 1400386 A2 3/2004
JP 55-138129 U 10/1980

* cited by examiner

*Primary Examiner*—Christopher P. Ellis
*Assistant Examiner*—John R. Olszewski
(74) *Attorney, Agent, or Firm*—Global IP Counselors, LLP

(57) ABSTRACT

In a vehicle drive system, a pair of rear wheels is driven by first and second motors. The first motor is designed to specifications suited to delivering torque at low rotational speeds and the second motor is designed to specifications suited to delivering torque at high rotational speeds. The motor used to drive the rear wheels is selected based on the vehicle speed. The change in the operations of the first and second motors is synchronized with a shifting of a transmission disposed between an engine and a pair of front wheels. Thus, the vehicle drive system is configured and arranged to accommodate speeds ranging from low speeds to high speeds in a sufficient manner without requiring the drive source to become large.

17 Claims, 5 Drawing Sheets

VEHICLE DRIVE SYSTEM

BACKGROUND OF THE INVENTION

1. Field of the Invention

The present invention relates to a vehicle drive system configured and arranged to drive a pair of front wheels and a pair of rear wheels of a vehicle with different drive sources.

2. Background Information

One example of a conventional vehicle drive system configured such that the front and rear wheels can be driven with a plurality of drive sources is disclosed in Japanese Laid-Open Utility Model Publication No. 55-138129. This reference discloses a four-wheel drive vehicle in which one of a pair of front wheels or a pair of rear wheels is driven with an engine and the other pair of wheels that is not driven with the engine is driven with a motor.

In view of the above, it will be apparent to those skilled in the art from this disclosure that there exists a need for an improved vehicle drive system. This invention addresses this need in the art as well as other needs, which will become apparent to those skilled in the art from this disclosure.

SUMMARY OF THE INVENTION

It has been discovered that, when the motor-driven wheels that are not driven by the engine are driven with a single electric motor as disclosed in the conventional vehicle drive system in the above mentioned reference, the electric motor is required to have a large output capacity in order to provide both high torque at low rotational speeds and sufficient torque at medium to high rotational speeds. One feasible method of increasing the output of the electric motor is to increase the number of coil windings and raise the magnetic flux of the motor. However, increasing the number of coil windings causes the size of the motor to become large.

The present invention was conceived in view of the above mentioned problem, and one object of the present invention is to provide a vehicle drive system that is capable of sufficiently accommodating rotational speeds ranging from low speeds to high speeds while preventing size of the drive sources from becoming large.

In order to achieve the aforementioned object, a vehicle drive system is provided that comprises first, second and third drive sources, a transmission, a gear change determining section and a drive source selecting section. The first and second drive sources are configured and arranged to drive at least one first wheel. The third drive source is configured and arranged to drive at least one second wheel. The transmission is installed in a power transmission path between the third drive source and the second wheel. The gear change determining section is configured to determine when the transmission changes gears. The drive source selecting section is configured to select at least one of the first and second drive sources to deliver the output to the first wheel. The drive source selecting section is further configured to start and stop delivering of the output from the at least one of the first and second drive sources to the first wheel in synchronization with the transmission changing gears in accordance with a determination by the gear change determining section.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
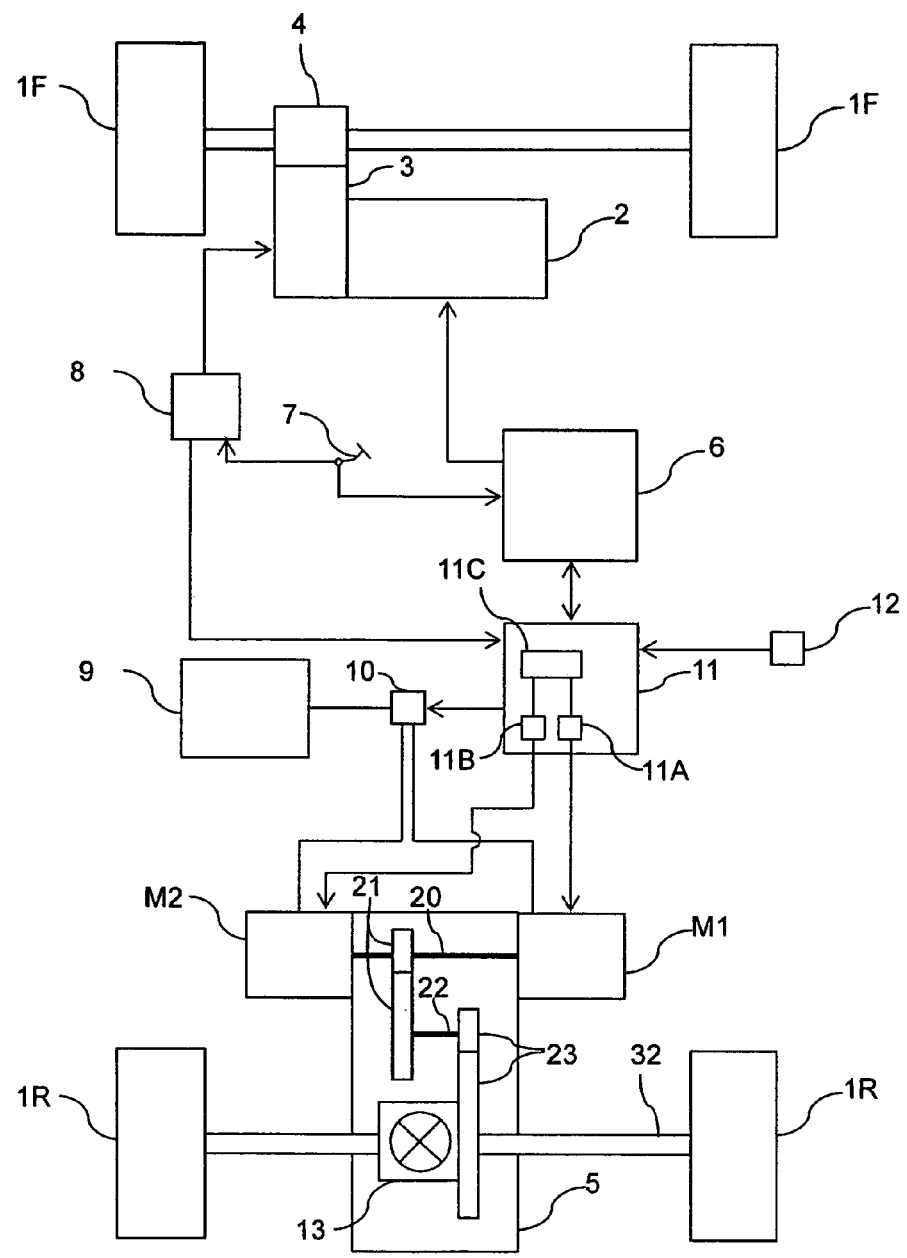
FIG. 1 is a schematic block diagram of a vehicle drive system in accordance with one embodiment of the present invention.

Referring initially to FIG. 1, a vehicle drive system is illustrated in accordance with one embodiment of the present invention. FIG. 1 is a schematic block diagram illustrating the vehicle drive system of the one embodiment.

As seen in FIG. 1, in this embodiment of the present invention, the vehicle drive system is preferably applied to a four-wheel drive vehicle in which a pair of left and right front wheels 1F is driven by an engine 2 and a pair of left and right rear wheels 1R is driven by a first electric motor M1 and/or a second electric motor M2. Moreover, the output of the engine 2 is delivered to the left and right front wheels 1F through a transmission 3 and a front wheel differential gear 4. The outputs of the first motor M1 and/or the second motor M2 (for example, disposed on right and left sides of the vehicle, respectively) are preferably delivered to the left and right rear wheels 1R through a reduction gear 5 and a rear wheel differential gear 13. In this embodiment, the engine 2 preferably constitutes a third drive source and the first and second motors M1 and M2 preferably constitute first and second drive sources, respectively.

The output of the engine 2 is preferably controlled by adjusting a throttle valve and other components based on commands from an engine controller 6. The engine controller 6 is configured to compute the amount by which the output of the engine 2 will be adjusted based on such factors as the vehicle speed and the amount by which an accelerator pedal 7 is depressed.

The transmission 3 is preferably an automatic transmission such as a conventional shifting type automatic transmission configured and arranged to change gears (i.e., shift) in accordance with a shift command issued from a transmission controller 8. The transmission controller 8 is configured to determine the shift position preferably based on the vehicle speed and the amount by which the accelerator pedal 7 is depressed, and issue a corresponding shift command to the transmission 3. The transmission controller 8 is also configured to send the shift command to a motor controller 11 as discussed in more detail below. Alternatively, the transmission controller 8 and the motor controller 11 can be arranged such that the transmission controller 8 is configured to send a gear change signal that is indicative of the transmission 3 changing the gear to the motor controller 11 instead of or in addition to the shift command.

The motor controller 11 preferably includes a microcomputer with a control program that controls the first and second motors M1 and M2 as discussed below. The motor controller 11 can also include other conventional components such as an input interface circuit, an output interface circuit, and storage devices such as a ROM (Read Only Memory) device and a RAM (Random Access Memory) device. The microcomputer of the motor controller 11 is programmed to control the first and second motors M1 and M2. The memory circuit stores processing results and control programs that are run by the processor circuit. The motor controller 11 is operatively coupled to the first and second motors M1 and M2 and other components of the vehicle drive apparatus in a conventional manner. The internal RAM of the motor controller 11 stores statuses of operational flags and various control data. The motor controller 11 is capable of selectively controlling any of the components of the control system in accordance with the control program. It will be apparent to those skilled in the art from this disclosure that the precise structure and algorithms for the motor controller 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The first and second motors M1 and M2 are preferably configured and arranged to use a battery 9 as a power source. The operations of the first and second motors M1 and M2 are preferably controlled by the motor controller 11. More specifically, the field currents of the first and second motors M1 and M2 are adjusted in accordance with commands issued from the motor controller 11 to generate the outputs. Then, as explained above, the output generated by the first and second electric motors M1 and M2 are preferably delivered to the rear wheels 1R through the reduction gear 5.

The first motor M1 is preferably configured and arranged to have low rotational speed torque specifications, while the second motor M2 is preferably configured and arranged to have high rotational speed torque specifications. As used herein, a motor that has low rotational speed torque specifications is a motor configured and arranged to output torque more readily at low rotational speeds (i.e., the peak torque value occurs at a low rotational speed). A motor that has high rotational speed torque specifications is a motor configured and arranged to output torque more readily at high rotational speeds (i.e., the peak torque value occurs at a high rotational speed).

In this embodiment, a drive mode switch 12 is preferably provided to the vehicle to switch between a two-wheel drive mode and a four-wheel drive mode. A start command is sent to the motor controller 11 when the drive mode switch 12 is set to the four-wheel drive position and a stop command is sent to the motor controller 11 when the drive mode switch 12 is set to the two-wheel drive position. When the start command is sent to the motor controller 11, the motor controller 11 is configured to control the first motor M1 and/or the second motor M2 to drive the rear wheels 1R, thereby achieving the four-wheel drive state. When the stop command is sent to the motor controller 11, the motor controller 11 is configured to terminate the driving of the first and second motors M1 and M2, and thus, the vehicle is driven only by the front wheels 1F coupled to the engine 2.

The motor controller 11 is preferably provided with a first motor control unit 11A, a second motor control unit 11B, and a motor control main unit 11C. The first motor control unit 11A is configured and arranged to supply drive input to the first motor M1 upon receiving an ON command from the motor control main unit 11C and terminate the drive input to the first motor M1 upon receiving an OFF command. Similarly, the second motor control unit 11B is configured and arranged to supply drive input to the second motor M2 upon receiving an ON command from the motor control main unit 11C and terminate the drive input to the second motor M2 upon receiving an OFF command.

More specifically, the first and second motor control units 11A and 11B are configured and arranged to control driving of the first and second motors M1 and M2, respectively, by connecting the power from the battery 9 to the first and second motors M1 and M2, and adjusting the field current of the first and second motors M1 and M2 to achieve a targeted rotational speed or output torque of the first and second motors M1 and M2. As shown in FIG. 1, a power distribution control unit 10 is provided to adjust the electric power delivered from the battery 9 to the first and second motors M1 and M2.

Figure 2:
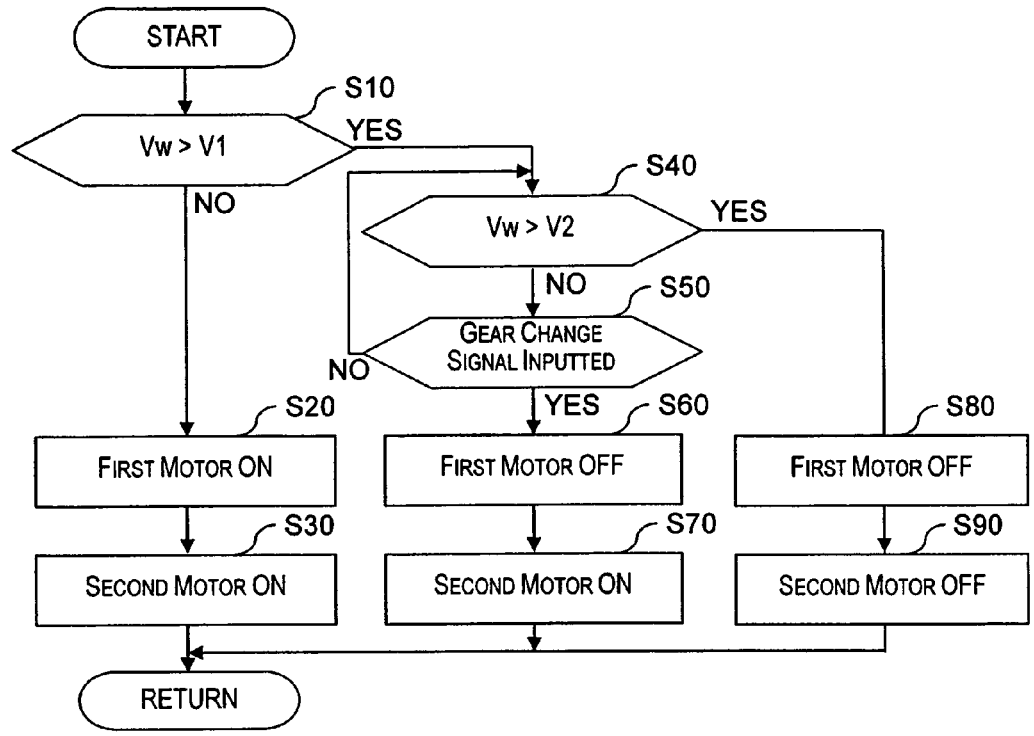
FIG. 2 is a flowchart for explaining a control processing executed by a motor controller of the vehicle drive system in accordance with the one embodiment of the present invention.

The control processing executed by the motor control main unit 11C upon receiving the start command from the drive mode switch 12 is now described with reference to the flowchart of FIG. 2. The control processing shown in FIG. 2 is executed repeatedly according to a prescribed sampling time until the motor control main unit 11C receives the stop command from the drive mode switch 12. Upon receiving the stop command, the motor control main unit 11C is configured to send OFF commands to the first and second motor control units 11A and 11B. Accordingly, in this embodiment, the motor control main unit 11C preferably constitutes a drive source selecting section.

In step S10 of FIG. 2, the motor control main unit 11C is configured to determine if the current vehicle speed Vw exceeds a prescribed changeover speed V1. If the vehicle speed Vw is equal to or less than the prescribed changeover vehicle speed V1, then the motor control main unit 11C is configured to proceed to step S20. If the vehicle speed Vw exceeds the prescribed changeover vehicle speed V1, then the motor control main unit 11C is configured to proceed to step S40. Alternatively, the motor control main unit 11C can also be configured to compare a rotational speed of the rear wheels 1R to a prescribed rotational speed in step S10 instead of using the current vehicle speed Vw.

The prescribed changeover vehicle speed V1 is preferably set based on the torque characteristics of the first motor M1 and/or the second motor M2. More specifically, the prescribed changeover vehicle speed V1 is preferably set to, for example, a vehicle speed (a speed obtained by multiplying the motor rotational speed by reduction ratio) corresponding to a high rotational speed at which the torque characteristic of the first motor M1 that has high rotational speed torque characteristic declines. For example, the prescribed changeover speed V1 is preferably set to approximately 20 km/hour in this embodiment. Of course, it will be apparent to those skilled in the art from this disclosure that the precise value of the prescribed changeover vehicle speed V1 varies depending on the torque characteristic of the first motor M1 and various other conditions.

In step S20, the motor control main unit 11C is configured to send the ON command to the first motor control unit 11A. Then the motor control main unit 11C is configured to send the ON command to the second motor control unit 11B in step S30 and end the control sequence. Thus, in this embodiment, when the current vehicle speed Vw is equal to or less than the prescribed changeover vehicle speed V1, both the first and second motors M1 and M2 will be turned on.

On the other hand, if the vehicle speed Vw is determined to be exceeding the changeover vehicle speed V1 in step S10, then the motor control main unit 11C is configured to proceed to step S40 to determine whether the vehicle speed Vw is larger than a prescribed threshold vehicle speed V2 that is larger than the prescribed changeover speed V1 (V2>V1). When the motor control main unit 11C determines the vehicle speed Vw is equal to or less than the prescribed threshold vehicle speed V2, the motor control main unit 11C is configured to proceed to step S50. On the other hand, when the motor control main unit 11C determines the vehicle speed Vw is larger than the prescribed threshold vehicle speed V2, the motor control main unit 11C is configured to proceed to step S80.

In step S50, the motor control main unit 11C is configured to determine if the shift command or the gear change signal was received from the transmission controller 8 during the period between the previous control cycle and the current control cycle. If the shift command or the gear change signal has not been received from the transmission controller 8 in step S50, then the motor control main unit 11C is configured to execute the loop of steps S40 and S50 until the shift command is received from the transmission controller 8 in step S50 or the vehicle speed Vw exceeds the prescribed threshold vehicle speed V2 in step S40. Thus, in this embodiment, step S50 preferably constitutes the gear change determining section. Moreover, executing the loop of steps S40 and S50 functions to ensure that the motor control main unit 11C proceeds to step S80 when the vehicle speed Vw exceeds a certain high speed in an exceptional case in which the change in the operations of the first and second motors M1 and M2 could not be synchronized with the gear change of the transmission 3.

Then, when the shift command is received from the transmission controller 8 in step S50, the motor control main unit 11C is configured and arranged to send the OFF command to the first motor control unit 11A in step S60 and to send the ON command to the second motor control unit 11B in step S70. Then, the motor control main unit 11C is configured and arranged to end the control processing of this cycle.

On the other hand, when the vehicle speed Vw exceeds the prescribed threshold vehicle speed V2 in step S40, the motor control main unit 11C is configured and arranged to send the OFF command to the first motor control unit 11A in step S80 and to send the OFF command to the second motor control unit 11B in step S90. Then, the motor control main unit 11C is configured and arranged to end the control processing of this cycle.

The operation and effects of the first embodiment of the present invention will now be described with reference to FIG. 3. In the following explanation, the vehicle is assumed to be operating in the four-wheel drive mode (i.e., the drive mode switch 12 is set to the four-wheel drive position).

Figure 3:
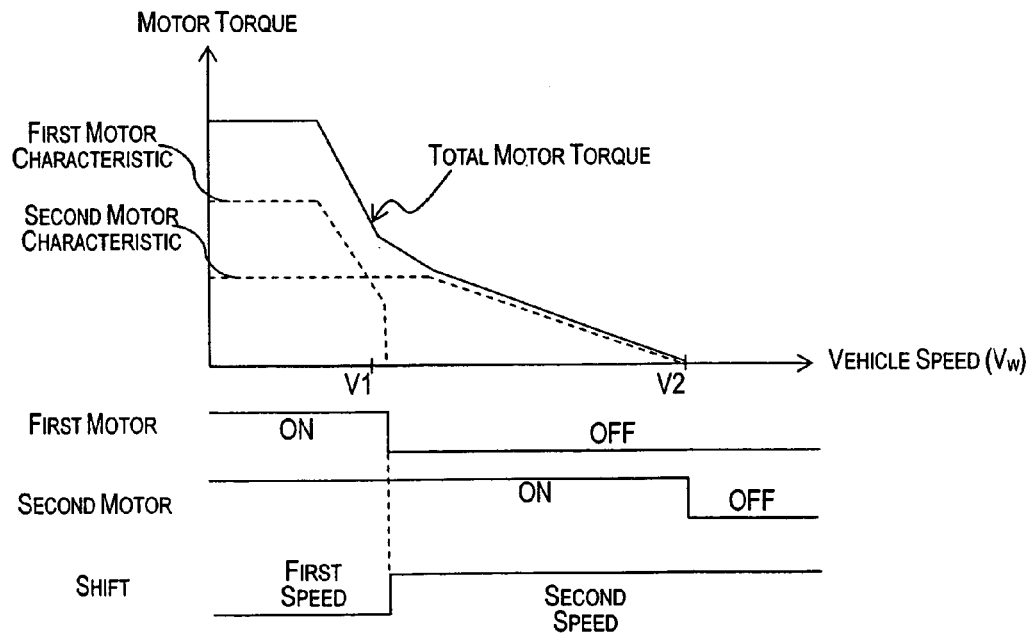
FIG. 3 is an example of a time chart for illustrating relationships between operations of the first motor, the second motor, and the motor torque and the transmission speed in accordance with the one embodiment of the present invention.

In this embodiment, both of the first and second motors M1 and M2 are preferably driven when the vehicle is starting to move from a stopped condition or is traveling at a speed equal to or below the prescribed changeover vehicle speed V1 as seen in FIG. 3. In other words, when the vehicle is starting to move from a stopped condition or traveling at a low speed Vw for which a large torque is required, the large torque can be delivered to the rear wheels 1R by driving (supplying drive input to) both of the first and second motors M1 and M2. Accordingly, powerful acceleration can be achieved when, for example, the vehicle is starting to move from a stopped condition.

On the other hand, when the vehicle speed Vw exceeds the prescribed changeover vehicle speed V1, the required torque is relatively small. Therefore, the first motor M1 is stopped and the rear wheels 1R are driven with the second motor M2. As explained above, the first motor M1 is arranged to have low rotational speed torque specifications and the second motor M2 is arranged to have high rotational speed specifications.

Since the first motor M1 preferably has low rotational speed torque specifications, the first motor M1 will not produce much torque when the vehicle is traveling at a high speed regardless of how much electric current is supplied to the first motor M1. Therefore, in the present invention, the first motor M1 is stopped when the vehicle speed exceeds the prescribed changeover vehicle speed V1 in order to reduce the unnecessary consumption of energy.

Additionally, in this embodiment, the timing at which the first motor M1 is stopped when the vehicle speed Vw becomes high is preferably synchronized with the shift timing of the transmission 3. The effects obtained as a result of this synchronization will now be described.

When the transmission 3 through which the drive torque of the engine 2 is delivered to the front wheels 1F (main drive wheels) upshifts, the drive torque imparted to the front wheels 1F decreases, i.e., changes. By synchronizing the termination of the drive input to the first motor M1 with this change in the drive torque delivered to the front wheels 1F, the shock associated with change in the torque delivered to the rear wheels 1R caused by stopping the first motor M1 can be substantially hidden from notice. In a case where the vehicle is operating in a four-wheel drive mode in which the torque of the rear wheels 1R is controlled in accordance with the acceleration slippage of the front wheels 1F, the front wheels 1F (main drive wheels) are more unlikely to slip when the transmission 3 through which the drive torque of the engine 2 is delivered to the front wheels 1F upshifts since the drive torque imparted to the front wheels 1F decreases. Therefore, in such case, the torque of the rear wheels 1R required is also relatively low. Thus, by selecting the appropriate motor (the first motor M1 and/or the second motor M2) to drive the rear wheels 1R when the transmission 3 upshifts, the appropriate torque for the vehicle operating in the four-wheel drive mod at vehicle speeds ranging from low speeds to high speeds can be obtained in accordance with the shift state of the transmission 3.

Also, as seen in FIG. 3, the vehicle drive system of the present invention is preferably configured and arranged to turn off the second motor M2 when the vehicle speed Vw reaches to a high speed in which the torque characteristic of the second motor M2 substantially decreases. Alternatively, the timing on which the second motor M2 is turned off can also be determined by, for example, when the transmission 3 shifts to a higher gear, or when the torque of the second motor M2 decreases to substantially close to zero. In any event, the second motor M2 is preferably stopped when the driving of the second motor M2 is no longer desirable.

In this embodiment explained above, the changing (changeover) in the operations of the first and second motors M1 and M2 is synchronized with the gear changing (upshifting) of the transmission 3 when the vehicle is transitioning from low speed travel to high speed travel as seen in FIG. 3. However, the invention is not limited to such arrangement. For example, the changeover in the operations of the first and second motors M1 and M2 can also be synchronized with the gear changing (downshifting) of the transmission 3 when the vehicle is transitioning from high speed travel to low speed travel.

In the above description of the embodiment, both the first motor M1 and the second motor M2 are driven when the vehicle speed Vw is equal to or less than the changeover vehicle speed V1 as seen in FIG. 3. The present invention is not limited to this arrangement. For example, the vehicle drive system of the present invention can be configured and arranged such that only the first motor M1 (which preferably has low rotational speed torque specifications) is driven when the vehicle speed Vw is equal to or less than the changeover vehicle speed V1 and only the second motor M2 (which preferably has high rotational speed torque specifications) is driven when the vehicle speed Vw is greater than the changeover vehicle speed V1. In such case, too, the first and second motors M1 and M2 can be selected appropriately in accordance with the vehicle speed Vw to achieve powerful acceleration when the vehicle is starting to move from a stopped condition and obtain the required torque when the vehicle is traveling at a high speed. Furthermore, the use of the two motors, i.e., the first and second motors M1 and M2, is divided appropriately based on whether low speed operation (e.g., when the vehicle is starting from a stop or the vehicle speed Vw is smaller than the prescribed changeover vehicle speed V1) or high speed operation is required. Since the burden imposed on the first and second motors M1 and M2 is dispersed progressively depending on the vehicle speed, a situation in which one of the first and second motors M1 and M2 wears out faster than the other can be prevented.

Figure 4:
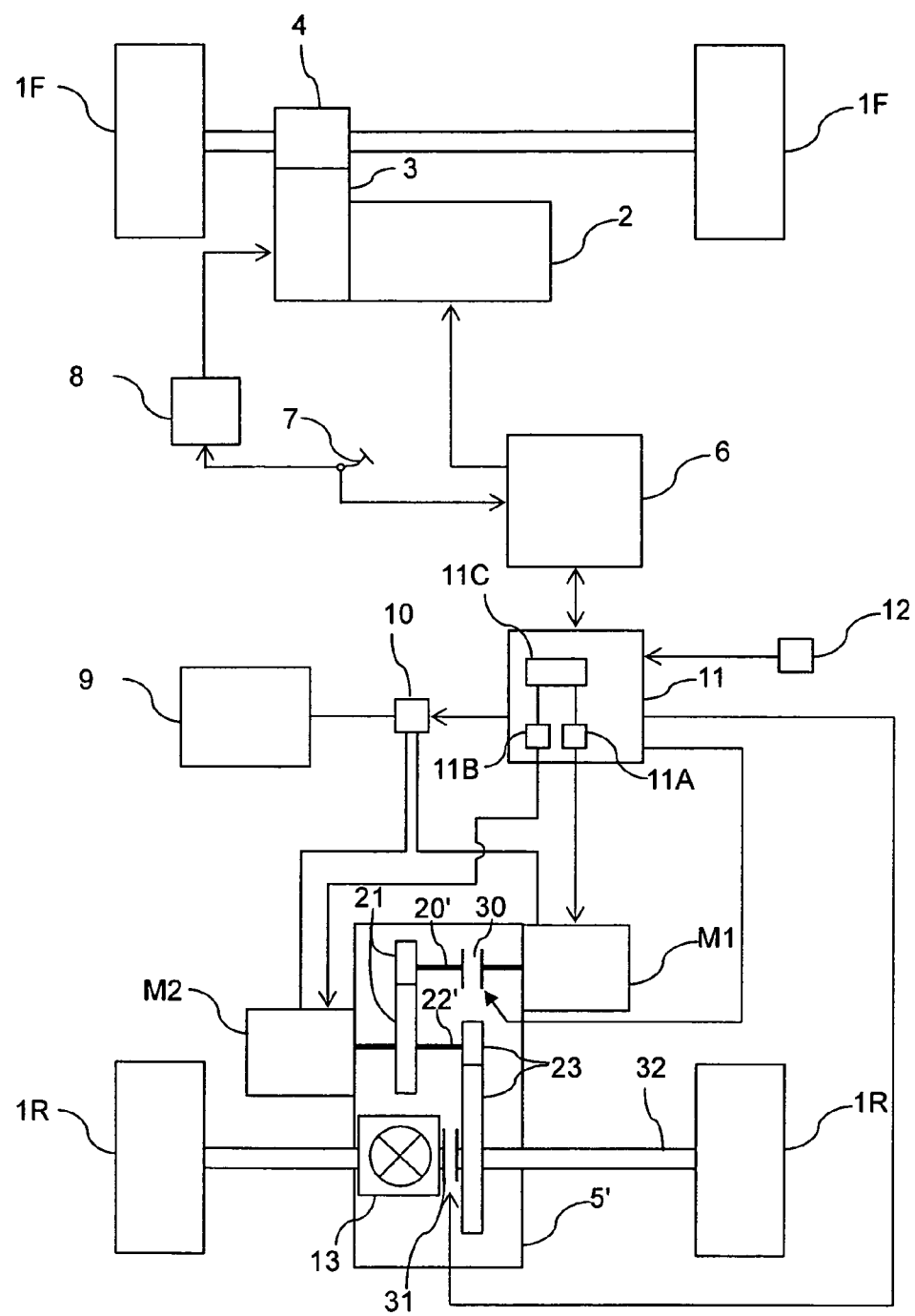
FIG. 4 is an schematic block diagram illustrating an alternative arrangement of motors and a reduction gear in the vehicle drive system in accordance with the present invention.

Moreover, the present invention is not limited to using the first and second motors M1 and M2 that have different torque specifications, i.e., one has low rotational speed torque specifications and the other has high rotational speed torque specifications. For example, FIG. 4 illustrates a modified configuration of the vehicle drive system in which the first and second motors M1 and M2 have identical torque specifications. As seen in FIG. 4, when the first and second motors M1 and M2 having identical torque specifications are used in the vehicle drive system of the present invention, the vehicle drive system is preferably arranged and configured to deliver the outputs of the first and second motors M1 and M2 to the wheels 1R with different reduction ratios. More specifically, in such case, the first motor M1 is preferably coupled to a first shaft 20' of a reduction gear 5' and the second motor M2 is preferably coupled to a second intermediate shaft 22' of the reduction gear 5' so that the output of the first motor M1 is transmitted to the wheels 1R with a higher reduction ratio than the output of the second motor M2. Thus, even when the torque specifications of the first and second motors M1 and M2 are substantially identical, the vehicle drive system is configured to utilize the first motor M1 that provides a low rotational speed torque characteristic and the second motor M2 that provides a high rotational speed torque characteristic. Moreover, as shown in FIG. 4, the reduction gear 5' preferably includes a subordinate clutch 30 configured and arranged to shut off delivering of the output of the first motor M1 to the wheels 1R, and a main clutch 31 configured and arranged to shut off delivering of the outputs of the first and second motors M1 and M2 to the wheel 1R. By releasing the subordinate clutch 30 while the main clutch 31 is temporarily released, the subordinate clutch can be readily released even when the vehicle is driving. Moreover, by releasing the subordinate clutch 30 after the first motor M1 is stopped, the first motor M1 can be prevented from rotating at an excessive rotational speed when the vehicle is traveling at a high speed. Accordingly, in this modified configuration of the vehicle drive system, too, the first motor M1 can be used when the vehicle is traveling at low speeds and the second motor M2 can be used when the vehicle is traveling at high speeds.

Also, in the embodiment explained above, the switching between the two-wheel drive mode and the four-wheel drive mode is explained as being executed by using the drive mode switch 12. Of course, it will be apparent to those skilled in the art from this disclosure that the control executed by the motor controller 11 can be also applied to when the vehicle shifts from the two-wheel drive mode to the four-wheel drive mode automatically based on the traveling conditions of the vehicle, such as when the front wheels 1F, i.e., the main drive wheels, slip during acceleration.

Moreover, the present invention is not limited to an arrangement in which the first and second motors M1 and M2 use the battery 9 as a power source. For example, the vehicle drive apparatus of the present invention can be applied to a battery-less four-wheel drive vehicle in which a generator is connected to the engine 2. In such a case, electric power generated by the generator can be supplied the first and second motors M1 and M2.

Furthermore, the present invention is not limited to utilizing only two motors, i.e., first and second motors M1 and M2. For example, a plurality of motors, three or more motors, can be used to deliver output to the rear wheels 1R in the present invention. In such a case, the torque specifications of the plurality of motors are preferably selected so that the motors are turned on/off (i.e., the motor(s) in use is/are switched) in the vicinity of the vehicle speeds corresponding to when the transmission 3 upshifts.

Also, the first and second motors M1 and M2 are not limited to an electric motor. For example, hydraulic motors or other type of conventional rotary drive source can be utilized as the first and second motors M1 and M2. Moreover, the first motor M1 and the second motor M2 are not limited to be the same kind of motor. For example, the first and second motors M1 and M2 can be different types of motors, e.g., one of the first and second motors M1 and M2 can be an electric motor and the other one can be a hydraulic motor.

In the embodiments described above, the timing at which the first motor M1 is stopped is preliminary determined based on the vehicle speed Vw (in step S10 of FIG. 2). However, the present invention is not limited to such arrangement. For example, the first and second motors M1 and M2 can also be controlled based on a shift command issued from the transmission controller 8, regardless of the vehicle speed Vw, such that only the first motor M1 or both the first and second motors M1 and M2 are run when the transmission 3 is in the first gear (first speed) and only the second motor M2 is run when the transmission 3 is in the second gear (second speed). In other words, in such arrangement, the first motor M1 is preferably stopped when the transmission 3 shifts from first gear to the second gear.

Figure 5:
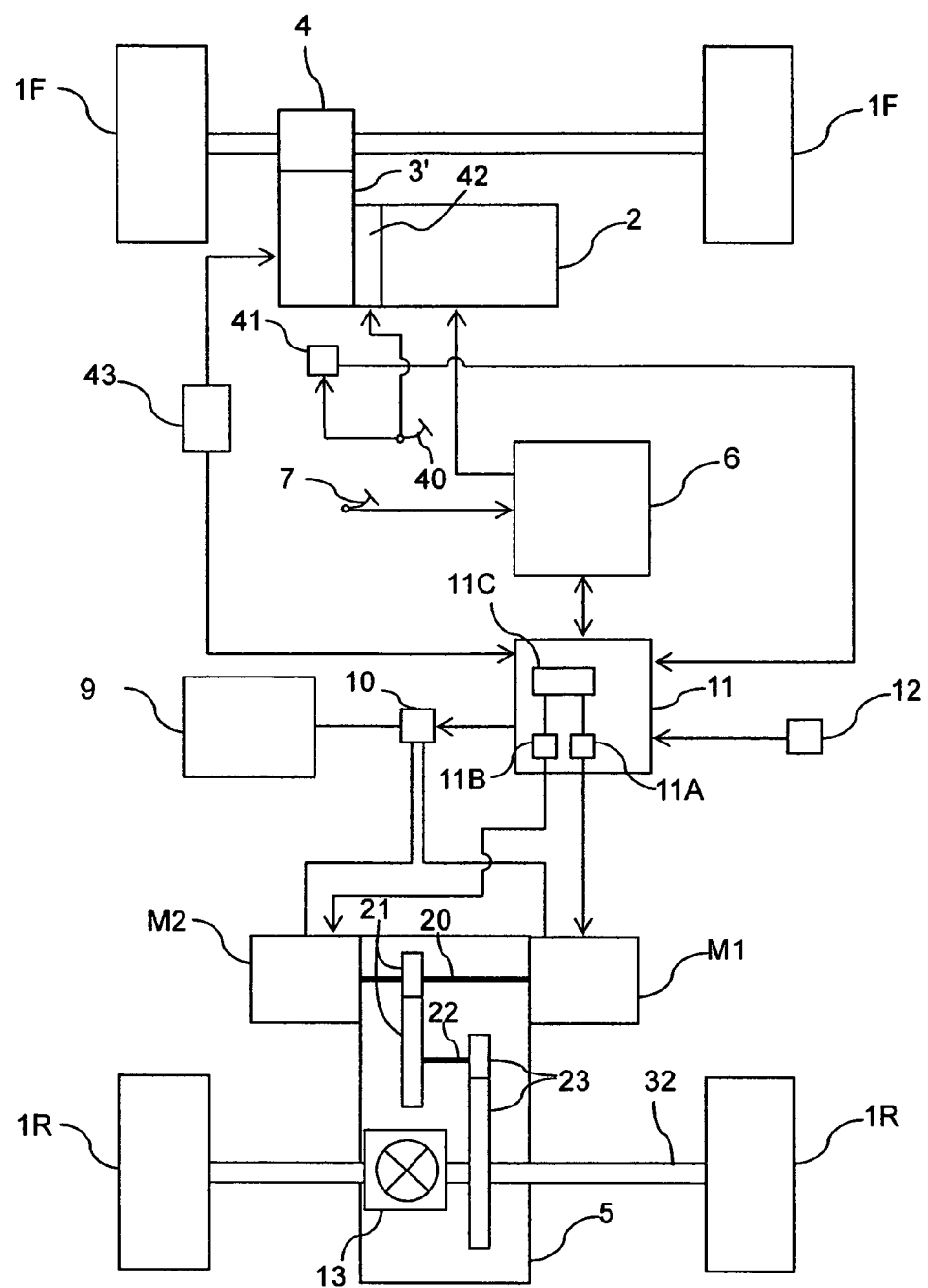
FIG. 5 is an schematic block diagram illustrating an alternative arrangement of the vehicle drive system when a manual transmission is used in accordance with the present invention.

Although the previous embodiments illustrate cases in which the transmission 3 is an automatic transmission, the transmission 3 is not limited to the automatic transmission. It will be apparent to those skilled in the art from this disclosure that the transmission 3 can be a manual transmission. For example, FIG. 5 illustrates a modified configuration of the vehicle drive system in accordance with the present invention in which a manual transmission 3'. As seen in FIG. 5, the modified configuration of the vehicle drive system further preferably include a clutch switch 41 coupled to a clutch pedal 40. The clutch pedal 40 is configured and arranged to control a clutch 42 disposed between the engine 2 and the manual transmission 3'. The gear change of the manual transmission 3' is preferably controlled by a manual shifter 43 coupled to the manual transmission 3'. The shifter 43 is also configured and arranged to send a shift command to the motor controller 11. When the manual transmission 3' is used, the motor control main unit 11C is preferably configured and arranged to execute the control illustrated in a flowchart of FIG. 6.

Figure 6:
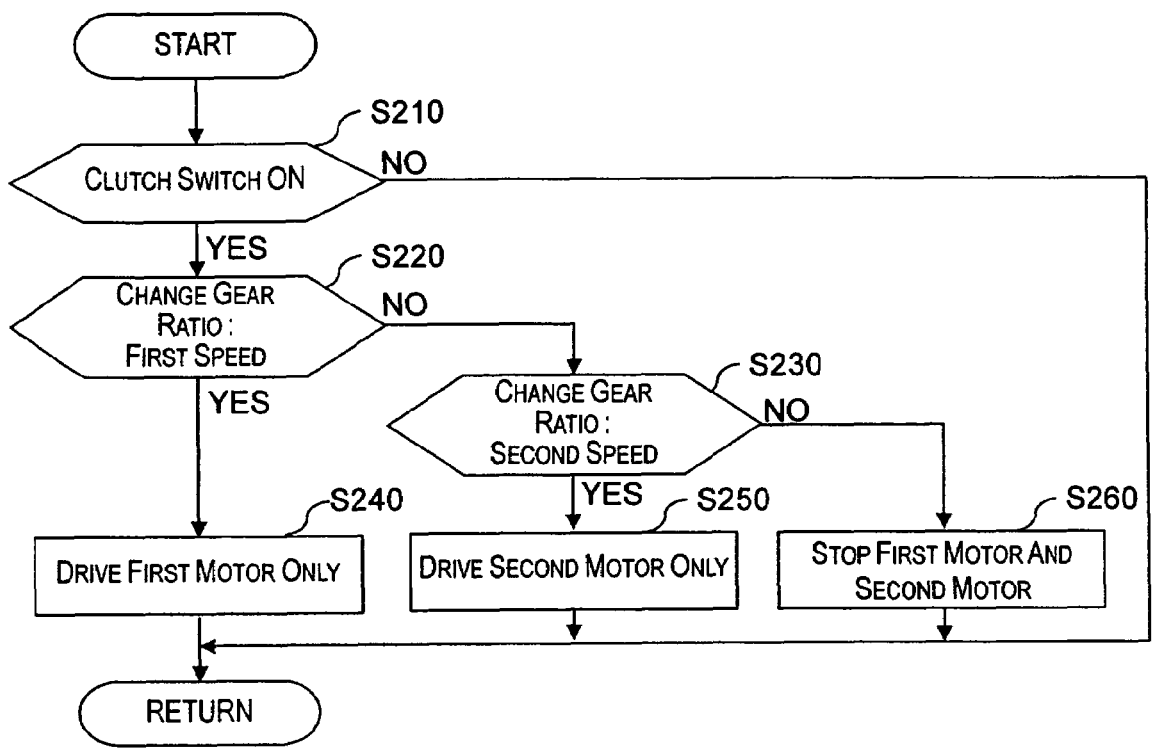
FIG. 6 is a flowchart for explaining an alternative control processing executed by the motor controller of the vehicle drive system when a manual transmission is used in accordance with the present invention.

The control sequence illustrated in FIG. 6 is preferably executed repeatedly according to a prescribed sampling time. In step S210, the motor control main unit 11C is configured to determine if the clutch switch 41 is ON which is indicative of the clutch pedal 40 being depressed. If the clutch switch 41 is ON, then the motor control main unit 11C proceeds to step S220. If the clutch switch 41 is OFF in step S210, then the motor control main unit 11C is configured to return to the beginning of the control sequence without changing the operations of the first and second motors M1 and M2.

In step S220 the motor control main unit 11C is configured to determine if the shift command (change gear ratio) is set to first speed. If the shift command is set to first speed, then the motor control main unit 11C is configured to proceed to step S240. In step S240, the motor control main unit 11C is configured to send the ON command to the first motor control unit 11A and the OFF command to the second motor 11B before ending the control sequence. Thus, when the change gear ratio of the manual transmission 3' is in the first speed, the vehicle drive system is configured and arranged to drive only the first motor M1. Of course, it will be apparent to those skilled in the art from this disclosure that the vehicle drive system can be also arranged to drive both of the first and second motors M1 and M2 when the change gear ratio of the manual transmission 3' is in the first speed.

If the motor control main unit 11C determines that the shift command is set to second speed in step S230, then the motor control main unit 11C is configured to proceed to step S250. In step S250, the motor control main unit 11C is configured to send the OFF command to the first motor control unit 11A and the ON command to the second motor 11B before ending the control sequence. Thus, when the change gear ratio of the manual transmission 3' is in the second speed, the vehicle drive system is configured and arranged to drive only the second motor M2.

If the clutch switch is ON in step S210 but the shift command is set to neither first speed nor second speed in step S220, then the motor control main unit 11C is configured to proceed to step S260. In step S260, the motor control main unit 11C is configured to send the OFF command to both the first motor control unit 11A and the second motor 11B before ending the control sequence. When the gear change ratio of the manual transmission 3' is neither in the first speed nor in the second speed, the vehicle drive system is configured and arranged to turn off both of the first and second motors M1 and M2 so that the vehicle is driven by the front wheels 1F coupled to the engine 2.

Thus, even when the manual transmission 3' is used, the operations of the first and second motors M1 and M2 that drive the rear wheels 1R is changed in synchronization with the gear changing of the manual transmission 3'.

Accordingly, with the vehicle drive system of the present invention, since the rear wheels 1R are configured to be driven by a plurality of drive sources, i.e., the first and second motors M1 and M2, each of the first and second motors M1 and M2 can be relatively small in comparison with the drive source used in a conventional vehicle drive system in which one drive source drives a pair of wheels. Also, with the present invention, the rear wheels 1R can be driven appropriately by selecting one of or both of the first and second motors M1 and M2 in accordance with the traveling state of the vehicle.

Additionally, by synchronizing the change in the operations of at least one of the first and second motors M1 and M2 with the gear changing of the transmission 3 or 3', the shock associated with changing in the operations of the at least one of the first and second motors M1 and M2 can be substantially hidden from notice.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application Nos. 2003-337883 and 2004-262462. The entire disclosures of Japanese Patent Application Nos. 2003-337883 and 2004-262462 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The invention claimed is:

1. A vehicle drive system comprising:
   first and second drive sources configured and arranged to drive at least one first wheel on a first drive axle;
   a third drive source configured and arranged to drive at least one second wheel on a second drive axle that is independent of the first drive axle;
   a transmission installed in a power transmission path between the third drive source and the second drive axle;

a gear change determining section configured to determine when the transmission changes gears; and a drive source selecting section configured to select at least one of the first and second drive sources to deliver the output to the first wheel, the drive source selecting section being further configured to stop delivering of the output from the at least one of the first and second drive sources to the first wheel in synchronization with the transmission changing gears in accordance with a determination by the gear change determining section.

2. The vehicle drive system as recited in claim 1, wherein the drive source selecting section is further configured to deliver the outputs from both the first and second drive sources to the first wheel when a vehicle speed is equal to or less than a prescribed changeover speed and to stop delivering of the output from the first drive source to the first wheel while maintaining delivering of the output from the second drive source to the first wheel when the vehicle speed exceeds the prescribed changeover speed.

3. The vehicle drive system as recited in claim 2, wherein the drive source selecting section is further configured to stop delivering of the output from the first drive source to the first wheel in synchronization with the transmission changing gears in accordance with the determination by the gear change determining section.

4. The vehicle drive system as recited in claim 1, wherein the second drive source is configured and arranged to generate torque at a higher rotational speed than the first drive source.

5. The vehicle drive system as recited in claim 2, wherein the second drive source is configured and arranged to generate torque at a higher rotational speed than the first drive source.

6. The vehicle drive system as recited in claim 1, wherein the first and second drive sources have substantially identical torque specifications.

7. The vehicle drive system as recited in claim 2, wherein the first and second drive sources have substantially identical torque specifications.

8. The vehicle drive system as recited in claim 1, wherein the third drive source is an internal combustion engine.

9. The vehicle drive system as recited in claim 1, wherein the first and second drive sources are electric motors.

10. The vehicle drive system as recited in claim 5, wherein the third drive source is an internal combustion engine.

11. The vehicle drive system as recited in claim 10, wherein the first and second drive sources are electric motors.

12. The vehicle drive system as recited in claim 11, wherein
the drive source selecting section is further configured to stop delivering of the output from the first drive source to the first wheel in synchronization with the transmission changing gears in accordance with the determination by the gear change determining section.

13. The vehicle drive system as recited in claim 3, wherein
the drive source selecting section is further configured to stop delivering of the output from the first drive source to the first wheel and delivering of the output from the second drive source to the first wheel when the vehicle speed exceeds a prescribed threshold vehicle speed which is larger than the prescribed change over speed irregardless of the determination by the gear change determining section.

14. The vehicle drive system as recited in claim 1, wherein
the drive source selecting section is further configured to deliver the output from the first drive source to the first wheel when a gear change ratio of the transmission is in first speed, and to deliver the output from the second drive source to the first wheel when the gear change ratio of the transmission is in second speed.

15. A vehicle drive system comprising:
first and second driving means for driving a first wheel on a first drive axle;
third driving means for driving a second wheel on a second drive axle that is independent of the first drive axle;
gear changing means for variably transmitting an output from the third driving means to the second drive axle;
gear change determining means for determining when the gear changing means changes gears; and
drive source selecting means for selecting at least one of the first and second driving means to deliver the output to the first wheel and for stopping delivering of the output from the at least one of the first and second drive means to the first wheel in synchronization with the gear changing means changing gears in accordance with a determination by the gear change determining means.

16. A vehicle driving method comprising:
selectively providing first and second drive sources for outputting drive forces to a first wheel on a first drive axle of a vehicle;
providing a third drive source for outputting drive force to a second wheel on a second drive axle of the vehicle that is independent of the first drive axle;
transmitting the drive force from the third drive source to the second drive axle with changing gears;
selecting at least one of the first and second drive sources to output the drive force to the first wheel based on a prescribed operating state; and
stopping delivering of the output of the at least one of the first and second drive sources to the first wheel in synchronization with the changing of gears.

17. The vehicle driving method as recited in claim 16 further comprising:
delivering the outputs from both the first and second drive sources to the first wheel when a vehicle speed is equal to or less than a prescribed changeover speed, and
stopping delivering of the output from the first drive source to the first wheel while maintaining delivering of the output from the second drive source to the first wheel when the vehicle speed exceeds the prescribed changeover speed.

* * * * *